Dec. 8, 1942.  F. H. REICHEL  2,304,206
PROCESS FOR PRODUCING FILAMENT
Filed April 6, 1939
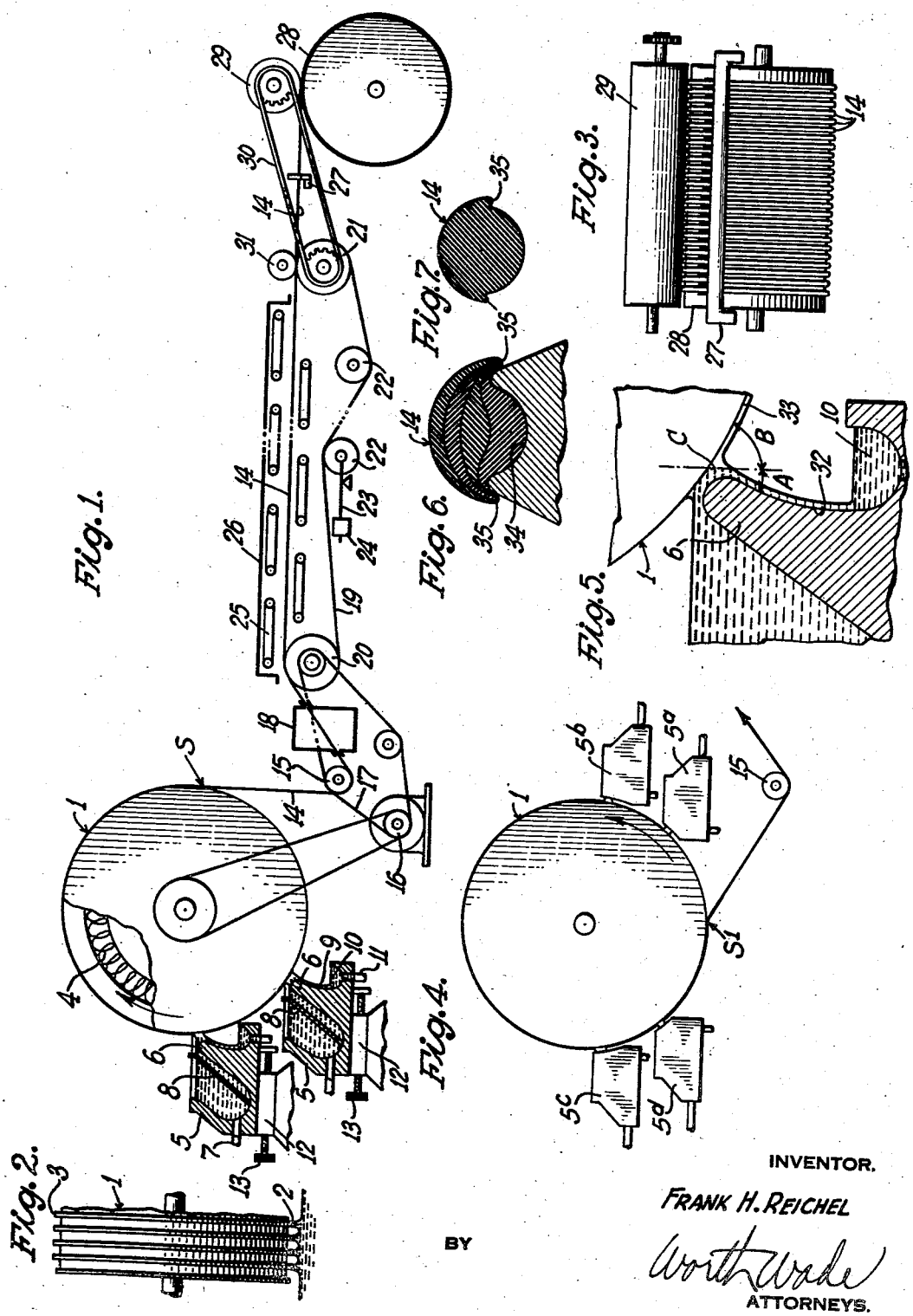
INVENTOR.
FRANK H. REICHEL
BY
Worth Wade
ATTORNEYS.

Patented Dec. 8, 1942

2,304,206

UNITED STATES PATENT OFFICE 2,304,206

PROCESS FOR PRODUCING FILAMENTS

Frank H. Reichel, Fredericksburg, Va., assignor to Sylvania Industrial Corporation, Fredericksburg, Va., a corporation of Virginia Application April 6, 1939, Serial No. 266,252

6 Claims. (Cl. 18—54)

This invention relates in general to elastic filaments and, in particular, to a process and apparatus for producing elastic rubber filament adapted for use in the textile arts, and to correlated improvements designed to improve the properties and characteristics of rubber filaments formed by molding processes.

It is known to mold rubber in the form of filaments by collecting latex and the like on a grooved projection of a rotating cylinder, heating the latex in the groove to form a coherent rubber deposit and continuously stripping the rubber deposit from the groove. The filament thus produced is characterized by two longitudinal fins which are formed by the rubber which extends over the edge of the groove. Since such fins are usually quite sharp and thin, they tend to tear and to age more rapidly than the body of the filament. Moreover, the exposed sides of filaments as heretofore formed in grooves have been generally flatter than the sides next to the groove, thereby forming filaments of irregular cross-section. It is usually difficult to control accurately the dimensions of the thread and a different groove is required for each size of thread.

It is a general object of the invention to provide a process and apparatus for permanently reducing the cross-sectional dimensions of elastic rubber thread.

Another general object of the invention is to improve the cross-sectional shape of molded elastic rubber filaments.

Another object of the invention is to provide a process and apparatus for molding elastic rubber filaments having a uniform configuration and weight throughout their length.

A specific object of the invention is to provide a means for producing from a grooved filament-forming device having a uniform size of groove, rubber threads of a wide variety of predetermined sizes.

Other objects of the invention will in part be obvious and will in part appear hereinafter.

According to the invention, an elastic rubber filament having a predetermined and uniform cross-section throughout the length and improved ageing qualities is produced by continuously collecting a heat-sensitized rubber latex in an endless groove to form a rubber deposit larger than that desired in the final filament, some of the rubber extending over the edges of the groove to form longitudinal fins on the filament, heating the latex in the groove to cause it to gel and completely coagulate in the form of a coherent rubber filament, continuously stripping the filament from the groove, continuously elongating the filament and annealing the stretched structure by heating the filament while it is supported throughout the section being heated. The filament is preferably dried and vulcanized while supported and in the elongated condition. In the preferred embodiment, the filament is elongated not in excess of about 250% while it is in the gel state and while it contains from about 5% to 30% moisture. The elongation under these conditions produces in a filament having smaller size of the fins relative to the body of the filament than could be produced if the filament were to be formed originally of the size produced by the elongation and the filament also undergoes an increase in modulus or "nerve" without an impairment of the tensile strength.

The apparatus for carrying out this preferred embodiment of the process comprises, in combination, a movable filament-forming member having a grooved collecting projection thereon, means to heat the grooved projection, means to maintain latex in a position to be continuously collected at one point in the groove, means to strip the filament continuously from the groove at a different point and to stretch the filament and means to subject the elongated filament to heat while it is supported throughout the length being heated.

The invention accordingly comprises the process having the several steps and the relation of one or more of such steps with respect to each of the others, the apparatus embodying features of construction, combinations and arrangement of parts adapted to effect such steps and the article which possesses the characteristics, properties and relation of elements, all as exemplified in the following detailed disclosure and the scope of the invention will be indicated in the claims. For a fuller understanding of the nature and objects of the invention, reference should be had to the following detailed description taken in connection with the accompanying drawing, in which:

Fig. 1 is a diagrammatical representation of one embodiment of suitable apparatus for carrying out the process of the invention;

Fig. 2 illustrates in a side view one embodiment of the filament-collecting member of the invention;

Fig. 3 represents a side elevation of the reeling means shown in Fig. 1;

Fig. 4 is a side elevation, partly in section, of another embodiment of the filament-forming device of the invention;

Fig. 5 is a side elevation of a fragment of the filament-forming member of Fig. 4 and associated elements during the formation of the filament of the invention;

Fig. 6 is a cross-sectional view of the edge of a grooved collecting projection showing a rubber deposit thereon; and Fig. 7 is a cross-sectional view of the rubber deposit shown in Fig. 6 after it has been stripped from the groove and stretched.

In the present invention, it is preferred to use rubber latex, either natural latex or artificial dispersions of natural or synthetic rubber, all of which are hereinafter referred to as "latex." The latex may comprise the usual compounding ingredients such as sulphur, zinc oxide, accelerators, activators for the accelerators, fillers, antioxidants, pigments, dispersion agents, etc. In the present invention, there is employed a latex which contains a dormant or latent coagulant which may be activated, as by heating to cause the latex to form a coherent gel, such compositions being herein designated "heat-sensitive latex." The latex may be heat-sensitized by any of the methods known in the art. For example, a suitably compounded latex may be heat-sensitized by adding to it a small quantity of a compound which will decompose on heating to form an acid capable of coagulating latex such, for example, as zinc ammonium benzoate, zinc ammonium lactate, ammonium sulphate and the like, the quantity being such that the latex will set to a coherent gel at a temperature of from 65° C. to 95° C. With such a heat-sensitized latex, the filament forming groove is heated to a temperature about 10° C. higher than the temperature at which the latex will gel.

In another embodiment of the invention, the latex with or without being heat-sensitized, is prevulcanized before it is formed into filaments. For example, the latex may have added to it a suitable rapid accelerator of vulcanization and sufficient sulphur, zinc oxide, activating agents and the like, and the latex heated to a moderate temperature or allowed to stand at room temperature for a sufficient period of time substantially to vulcanize the rubber globules in the latex without causing the coagulation of the latex. The extent of pre-vulcanization can be followed by testing the free sulphur content or by any other method known in the art.

The condition of the filament at the time stretching takes place is important. According to the preferred embodiment of the present invention the filament is stretched (a) after the rubber has been completely coagulated, (b) while the latex is in a coherent gel state and (c) while the gelled latex contains from about 5% to 30% of moisture. If the filament is stretched after the coagulation is substantially completed, the product is more uniform in physical properties and more regular in dimensions throughout the length, than when the stretching takes place during coagulation or after partial coagulation and before the coagulation is completed. When the non-heat-sensitized latex is heated and the water contained therein is evaporated the rubber residue is not a gel in the sense in which this term is used in the present invention. The heating of a heat-sensitized latex in accordance with the present invention gives a filament in the gel state having substantially the shape of the original mass of liquid latex and in which the rubber globules appear to be in a more mobile state than they are in a rubber deposit formed by merely drying a latex not containing a gelling agent. In this invention it has been found that the modulus, breaking elongation and tensile strength of the dried and vulcanized filament is a function of the moisture content of the gel at the time of stretching and a function of the percentage elongation. Superior results are obtained when the stretching takes place on a gel having a moisture content of from about 15% to 20%.

The extent to which the rubber filament should be stretched to attain the correlated objects of the invention will vary depending inter alia upon the moisture content of the rubber gel. In general, the lower the moisture content, the lower the elongation required to produce a given effect, whereas with the higher moisture content in the gel, the elongation must be increased to attain substantially the same result. Moreover, the temperature required during annealing to completely relieve the stresses will depend also upon the moisture content of the gel at the time of stretching. For example, if the rubber gel is stretched while containing a low percentage of moisture, that is, when it is almost dry, a higher annealing temperature is required than when one anneals a thread stretched while containing higher moisture contents. These inter-related functions permit a wide variation in the working conditions during stretching.

According to the present invention the stretch, that is elongation of the rubber filaments in the gel state, takes place without the application of heat, that is, the stretching is carried out without substantially increasing the temperature of the thread during stretching. It has now been found that heating of the filaments while stretching is taking place tends to cause an irregular setting of the stretched structure, whereas stretching without the application of heat results in a more uniform product. It has now been found that if the extent of elongation is not substantially greater than 250% of the initial unit length of the filaments, the modulus of the dried and vulcanized product is materially improved by stretching in the gel state without causing a material decrease in the tensile strength or breaking elongation of the dried and vulcanized product. Therefore, in the present invention, the rubber filament is elongated while in the gel state not substantially more than 250% and preferably about 150%. It will be apparent that by varying the initial size of the filament, the percentage elongation may be kept below 250% regardless of the dimensions desired in the product.

The stretching or elongation of the filament may be effected by any suitable means such, for example, as a roller or belt, or a plurality of spaced rollers or belts adapted to move at different speeds. The roller or belt may be positioned so as to withdraw the thread from the filament-forming means at a predetermined rate.

The stripping roller 15 as shown in the drawing is positioned at a short distance from the grooved cylinder such as from 12 to 18 inches, and such roller is rotated at a sufficient speed simultaneously to strip the filaments from the groove and to elongate the stripped filaments in the interval between these means. A moving belt may be substituted for the stripping roller just described.

To anneal the stretched structure of the filament it is subjected to heat for a period and at a temperature sufficient to cause the heated filament to remain permanently in its elongated condition. Preferably heating is carried to such an extent as to complete the drying of the filament. The heating may be effected by passing the filament through an atmosphere heated to a temperature not above the boiling point of water and preferably from about 65° to 95° C. The expression "annealing" means heating sufficiently to set the stretched structure and may or may not include drying.

In the now preferred embodiment of the invention the heating of the elongated filament takes place while the filament is supported throughout its length and maintained in its elongated condition. For example, the filament is continuously conveyed upon the surface of an endless belt or of a large cylinder and simultaneously heated. Heat may be applied to the filaments by means of a hot gas or a hot liquid. By supporting the filament during heating a more uniform product is obtained.

The elongated and dried filament may be subjected to any suitable finishing treatments. The filaments may be rendered non-tacky by application to them of talc, starch, clay, or the like before or after stretching them. Preferably the filaments are wound upon a reel with a slight tension, the reel being of such a character as to support the filaments throughout their length, for example, a cylindrical reel.

Vulcanization of the elongated filaments may take place in any suitable manner as known in the art, but preferably the filaments are vulcanized while they are under a slight tension and fully supported throughout their length. The tension of the filaments during reeling and vulcanizing may be such as would cause an elongation of from ½% to 3½%. By carrying out the vulcanization in this manner, the size to which the filaments have been stretched is maintained and there is no tendency for the filaments to retract.

Referring to Fig. 1 and Fig. 2, one embodiment of the apparatus comprises a filament-forming member 1 adapted to be moved through an endless path and having a plurality of continuous collecting projections 2 each having a longitudinal groove 3 therein as shown in Fig. 2 and made of any suitable non-corrosive material such, for example, as stainless steel, porcelain, glass, etc. Heat may be applied to the collecting projection by reflection or directly, for example, by an electric heater 4 embedded in the member 1. The member 1 may be a rotatable cylinder as illustrated, or it may be in the form of a movable endless belt or the like.

In proximity to the grooved projections 2 there is positioned a latex container 5 preferably made of a non-corrosive material of one of the above-mentioned types and provided with conventional means such as a weir 6 to maintain the latex 3 at a predetermined level and a conduit 7 through which latex may be supplied into the container at a specified rate. Mounted between the conduit 7 and the weir 6 is a spacer plate 8, the bottom portion of which is perforated to cause the latex to flow from the conduit 7 in an annular path forming a relatively wide horizontal apex at the peak of the weir 6. The latex flows down the outside surface 9 of the weir into a chamber 10 and may be conducted away through a conduit 11.

Additional latex containers of like or similar construction may be employed to enable the latex to be collected a plurality of times at spaced points on a common grooved projection as shown in the drawing. The latex containers and/or the weirs therein are adjustably mounted with respect to the filament-forming member. For example, as shown in Fig. 1, the latex containers may slide upon a support 12 and be moved into proper position by means of a threaded screw 13.

The latex container is so positioned during operation of the wheel 1 that the grooves are spaced away a slight distance from the normal surface of the latex. The latex is picked up and maintained in constant contact with the grooves by reason of surface tension and capillarity, as shown in Fig. 2.

The heat of the forming member sets the heat-sensitized latex in the groove as a gel which is strong and coherent by the time the wheel travels to the stripping point A. The gelled deposit is stripped from the groove as filament 14 by means of the roller 15 which is positively driven by means of the prime mover 16 through the chain belt 17. From the roller 15, the filaments may be passed through a dusting box 18 containing talc, starch, or like substance to render the filaments non-tacky.

From the dusting means, the filaments pass to means for continuously heating the filaments such, for example, as an endless belt 19, the upper surface of which moves preferably in a horizontal plane about the spaced rollers 20 and 21 through a heated atmosphere. To maintain the belt under suitable tension, there may be provided a fixed roller 22 and an adjustable roller 22' mounted at one end of a lever 24 having an adjustable weight 22 at the other end. Means are provided for heating the filaments which are carried on the upper surface of the belt, such, for example, as heating coils 25 having a reflecting hood 26 thereover, which coils may be disposed above the belt, or both above and below the upper section of the belt, as shown. Alternatively, the heating coils and/or a portion or all of the belt may be enclosed within a chamber which may be heated by suitable means in a known manner.

From the dry end of the belt 19 the filaments pass through a separating comb 27 and then to a reel comprising a rotatable drum 28 adapted to be surface-driven by contact with the roll 29 which is conveniently driven from the roll 21 by a chain drive 30. The comb 27 is provided with a known means, such as a heart-shaped cam, not shown, for imparting to it a slight transverse motion so that the individual filaments are wound upon the drum in substantially separate piles as shown in Fig. 3 which prevents entangling.

There is shown in Fig. 4 another embodiment of the filament-forming unit in which latex containers are disposed on opposite sides of the filament-collecting cylinder 1, the latex being picked up first from the containers 5a and 5b while the collecting member is moving in an upward direction and the latex being picked up from the containers 5c and 5d while the collecting member is moving in a downward direction. The filaments are stripped at a point S' between the lowermost latex containers by means of a stripping roller 15. With this device, the latex is so compounded and the cylinder operated at such a temperature that the latex is coagulated preferably gelled between each pick-up point. Thus, a heavier, rounder filament can be produced by the device shown in Fig. 4 as compared to that produced by the device shown in Fig. 1. Such a heavier, rounder filament is illustrated in Figs. 6 and 7. The separate deposits are indicated in Fig. 6 wherein the first deposit fills the groove as shown at 34 and the succeeding deposits round out the opposite side of the filament. The fins 35 are thicker and tend to blend into the general contour of the filament and are less prominent in the completed filament as shown in Fig. 7.

To avoid the bridging of the latex over the separating grooves, the under surface 32 of the weir 6 is shaped as shown in Fig. 5 so that the angle A formed between this surface and a line passing through the point C of contact between the latex and the collecting member 1 is less than the angle B which is formed between such line and the surface 33 of the collecting member 1. When so shaped, the latex tends to flow by preference down the weir.

It is to be understood that various changes may be made in the process and in the apparatus employed for carrying out the present invention. For example, the stretching may take place in a plurality of steps separated by rest periods. Further, if the heating of the filaments during formation is not sufficient to reduce the moisture content of the gel to the desired percentage, an auxiliary heating means may be positioned between the filament-forming means and the stretching device, so that the moisture in the filament may be evaporated to the desired extent before stretching takes place. When the latex is partially or completely pre-vulcanized, as above described, the filament-forming means and/or filament-annealing means may be heated to a sufficient temperature and the time of heating may be regulated, so that the dried filament is completely vulcanized and requires no subsequent vulcanization.

By the present invention there has been provided a process and apparatus for improving the modulus of a rubber filament without substantially altering other important characteristics of the filament, such as tensile strength and breaking elongation. There may be produced from a filament-forming device such as a groove of one size, a plurality of filaments of different sizes. Moreover, when filaments formed in a groove are stretched by the present invention the longitudinal fins on such filaments are smaller relative to the body of the filament than when the filament is formed originally in the smaller size, whereby the product has improved ageing characteristics. The present process also provides means for diminishing the cross-sectional size and configuration of rubber filaments in a uniform manner throughout their length.

Having described my invention, what I claim as new and desire to secure by Letters Patent is:

1. In a process for producing an elastic rubber filament, the steps comprising shaping a heat-sensitized latex in the form of a filament having a body portion and longitudinally extending fins by continuously collecting the latex in a groove from a flowing stream of latex by the use of the surface tension and capillarity of the latex, heating the latex to coagulate it in the form of a coherent gel, stripping the filament from the groove, elongating the filament while in the wet gel state to produce a filament having fins smaller in cross section relative to the body portion than could be produced by originally forming the filament of the desired final, cross-sectional size and annealing the elongated filament.

2. In a process for producing an elastic rubber filament, the steps comprising shaping a heat-sensitized latex in the form of a filament having a body portion and longitudinally extending fins by continuously collecting the latex in a groove from a flowing stream of latex by the use of the surface tension and capillarity of the latex, heating the latex to coagulate it in the form of a coherent gel, stripping the filament from the groove, elongating the filament while in the wet gel state to produce a filament having fins smaller in cross section relative to the body portion than could be produced by originally forming the filament of the desired final, cross-sectional size and annealing the elongated filament while it is supported throughout the section being annealed.

3. A process for producing an elastic rubber filament comprising continuously collecting a heat-sensitized rubber latex in an endless groove by the use of the surface tension and capillarity of the latex to form a rubber deposit larger in cross section than that required in the final filament, some of the latex extending from the edges of the grooves to form longitudinal fins on the filament, heating the latex in the groove to coagulate it in the form of a coherent gel, continuously stripping the rubber filament from the groove, continuously elongating the filament to reduce the cross section thereof to the desired size, whereby a filament having fins which are smaller relative to the remainder of the filament is produced than could be produced by originally forming the filament of the desired final, cross-sectional size, and passing the elongated filament through a heated atmosphere to anneal the filament while it is supported throughout the section being heated.

4. A process for producing an elastic rubber filament comprising shaping liquid latex in the form of a filament comprising a body having longitudinal fins, heating the latex to coagulate it in the form of a coherent gel, thereafter elongating the filament while in the wet gel state to produce a filament having fins smaller in cross section relative to the body of the filament than could be produced by originally forming the filament of the desired final, cross-sectional size, and annealing the elongated filament.

5. A process for producing an elastic rubber filament comprising collecting liquid latex a plurality of times in a common groove to form a filament having a body provided with longitudinal fins, the deposits of latex being superimposed coagulate them in the form of a coherent film, on each other, heating the latex deposits to thereafter elongating the filament while it is in the wet gel state to produce a filament having fins smaller in cross section relative to the body than could be produced by originally forming the filament of the desired final, cross-sectional size and annealing the elongated filament.

6. In a process for producing an elastic rubber filament, the steps comprising elongating a coagulated rubber filament not in excess of about 250 per cent while it is in a wet gel state containing from about 15 per cent to 20 per cent moisture, and annealing the elongated filament, whereby the modulus of the filament is improved.

FRANK H. REICHEL.

CERTIFICATE OF CORRECTION.

Patent No. 2,304,206. December 8, 1942.

FRANK H. REICHEL.

It is hereby certified that error appears in the printed specification of the above numbered patent requiring correction as follows: Page 4, second column, line 57, claim 5, strike out the words "on each other, heating the latex deposits to" and insert the same after "superimposed" in line 55, same claim; and that the said Letters Patent should be read with this correction therein that the same may conform to the record of the case in the Patent Office.

Signed and sealed this 6th day of April, A. D. 1943.

(Seal)

Henry Van Arsdale,
Acting Commissioner of Patents.